(12) United States Patent
Ohsuga

(10) Patent No.: US 7,647,601 B2
(45) Date of Patent: Jan. 12, 2010

(54) PICKUP DRIVE MECHANISM AND RECORDING MEDIUM DRIVE HAVING THE SAME

(75) Inventor: Akira Ohsuga, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 410 days.

(21) Appl. No.: 11/080,674

(22) Filed: Mar. 16, 2005

(65) Prior Publication Data

US 2005/0289579 A1 Dec. 29, 2005

(30) Foreign Application Priority Data

Mar. 19, 2004 (JP) .............................. 2004-080915

(51) Int. Cl.
*G11B 7/09* (2006.01)
*G11B 7/00* (2006.01)

(52) U.S. Cl. ...................................... 720/675; 720/663

(58) Field of Classification Search ................ 720/661, 720/663–665, 672–680, 688, 691–694, 662
See application file for complete search history.

(56) References Cited

U.S. PATENT DOCUMENTS

| | | | |
|---|---|---|---|
| 6,335,915 B1 * | 1/2002 | Uchiyama et al. | 369/223 |
| 6,373,812 B2 * | 4/2002 | Kim et al. | 720/675 |
| 6,445,673 B2 * | 9/2002 | Park | 720/675 |
| 6,657,943 B2 * | 12/2003 | Muto et al. | 720/619 |
| 7,216,354 B2 * | 5/2007 | Hermanns | 720/679 |

FOREIGN PATENT DOCUMENTS

| | | |
|---|---|---|
| JP | 6-162695 | 6/1994 |
| JP | 9-139030 | 5/1997 |
| JP | 10-125016 | 5/1998 |
| JP | 11-25472 | 1/1999 |
| JP | 2001-227931 | 8/2001 |

OTHER PUBLICATIONS

Office Action dated Feb. 10, 2009 issued for the corresponding Japanese patent application No. 2004-080915.
Office Action issued for the corresponding Japanese patent application No. 2004-080915 dated May 26, 2009 with English translation.

* cited by examiner

*Primary Examiner*—Andrea L Wellington
*Assistant Examiner*—Nathan Danielsen
(74) *Attorney, Agent, or Firm*—Kratz, Quintos & Hanson, LLP

(57) ABSTRACT

A pickup supporter 72 supporting a pickup device 70A includes a driver 76 having an abutting surface 764 that is a flat surface substantially in parallel to an axial direction of a lead screw 752 and intersecting with both a focus direction and a plane direction substantially vertical to the focus direction. With such arrangement, even when a posture of the pickup supporter 72 is changed by adjusting heights of the main shaft 74A and the sub shaft 74B, the screw abutting surface 764 can abut on the lead screw 752 at a substantially constant angle. Therefore, when the posture of the pickup supporter 72 is changed, substantially constant driving force can be transmitted from the lead screw 752, so that stable and proper driving force can be constantly obtained.

10 Claims, 7 Drawing Sheets

PICKUP DRIVE MECHANISM AND RECORDING MEDIUM DRIVE HAVING THE SAME

BACKGROUND OF THE INVENTION

1. Field of the Invention

The present invention relates to a pickup driving mechanism for reproducing and/or recording information recorded on a disc and a recording medium drive having the same.

2. Description of Related Art

Conventionally, there has been know a pickup drive mechanism for moving a pickup device along a recording surface of CD and DVD, the pickup device recording information recorded on an optical recording medium such as CD and DVD or reproducing the recorded information (see for instance, Reference 1: Japanese Laid-Open Patent Publication No. Hei 9-139030, page 3 to 4, FIGS. 1 and 2).

The pickup drive mechanism disclosed in the Reference 1 includes: a drive gear driven to rotate by an electric motor; a pickup supporter with a pickup fixed thereto, a radial movement of which is guided by two guide shafts in parallel to each other; a driver attached to the pickup supporter and provided with a rack gear that meshes with the drive gear; and a plate spring attached to the pickup supporter and adapted to bias the substantially entire length of the rack gear in a direction meshing with the drive gear. In such arrangement, there is known an arrangement capable of adjusting heights of the guide shafts to fine adjust a gap between the pickup and a recording surface of a disc.

In the pickup drive mechanism disclosed in Reference 1, an abutting surface (abutting on the drive gear) of the driver attached to the pickup supporter is formed in parallel to a focus position being substantially vertical to the recording surface of the disc. However, in such arrangement, when the heights of the guide shafts are adjusted to adjust the gap size between the pickup and the recording surface of the disc, difference is generated in heights between one of the guide shafts and the other. Thus, the pickup supporter rotates around the guide shafts to change the posture. Accordingly, the abutting surface of the driver rotates so as to move away from and toward the driving gear. Thus, when the abutting surface is tilted in a direction away from the drive gear, it becomes difficult for the abutting surface to receive driving force of the drive gear, which might affect drive of the pickup supporter. On the other hand, when the abutting surface of the pickup supporter is tilted toward the drive gear, the abutting surface strongly presses the drive gear, which affects rotation of the drive gear. Therefore, tilt angle between the abutting surface of the driver and a gear surface of the drive gear have to be taken into account in adjusting the guide shafts, so that operations become troublesome and production cost increases.

SUMMARY OF THE INVENTION

An object of the present invention is to provide a pickup drive mechanism capable of properly transmitting driving force to a pickup device even when a posture of a supporter for supporting the pickup device is changed, and a recording medium drive having the pickup drive mechanism.

A pickup drive mechanism according to an aspect of the present invention includes: a supporter for supporting a pickup device; a plurality of height-adjustable support shafts provided in parallel to each other and slidably supporting the supporter; and a lead screw for sliding the supporter along the support shafts, in which: a posture of the supporter can be changed by adjusting heights of the support shafts; the supporter has a screw abutting surface that is formed substantially in parallel to an axial direction of the lead screw while abutting on the lead screw; and the screw abutting surface is angled to intersect respectively with a focus direction substantially orthogonal to a recording surface of a disc where a data is reproduced and/or recorded by the pickup device, and a plane direction orthogonal to the focus direction as well as substantially in parallel to the support shafts.

BRIEF DESCRIPTION OF THE DRAWINGS

FIG. 7B is a cross section showing a screw abutting surface of still another modification of the present invention;

DETAILED DESCRIPTION OF PREFERRED EMBODIMENT(S)

An embodiment of the present invention will be described with reference to the attached drawings. FIGS. 1 to 6C show a recording medium drive of the present embodiment.

[Arrangement of Recording Medium Drive]

Figure 1:
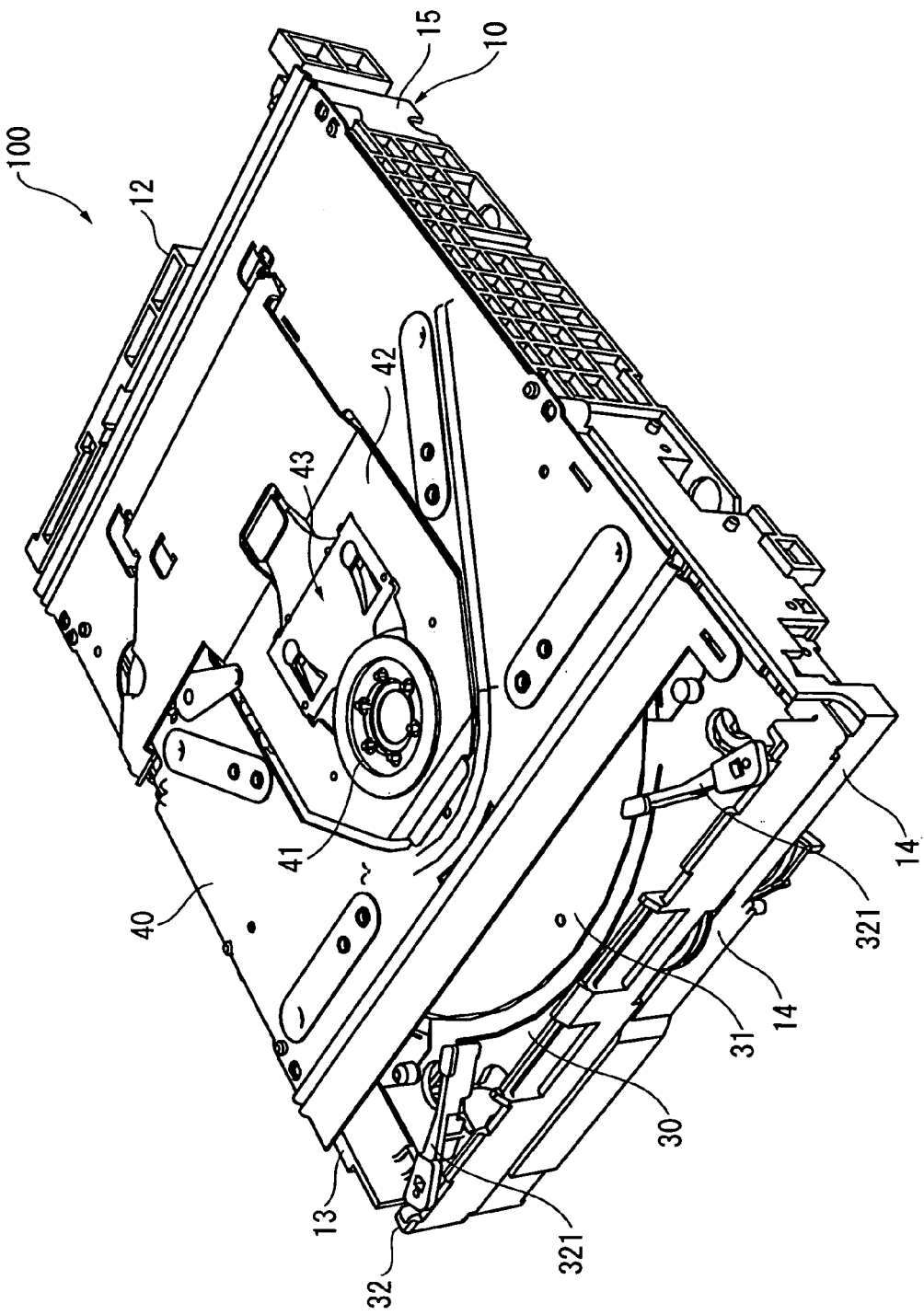
FIG. 1 is a perspective view of a recording medium drive of a present embodiment.
Figure 2:
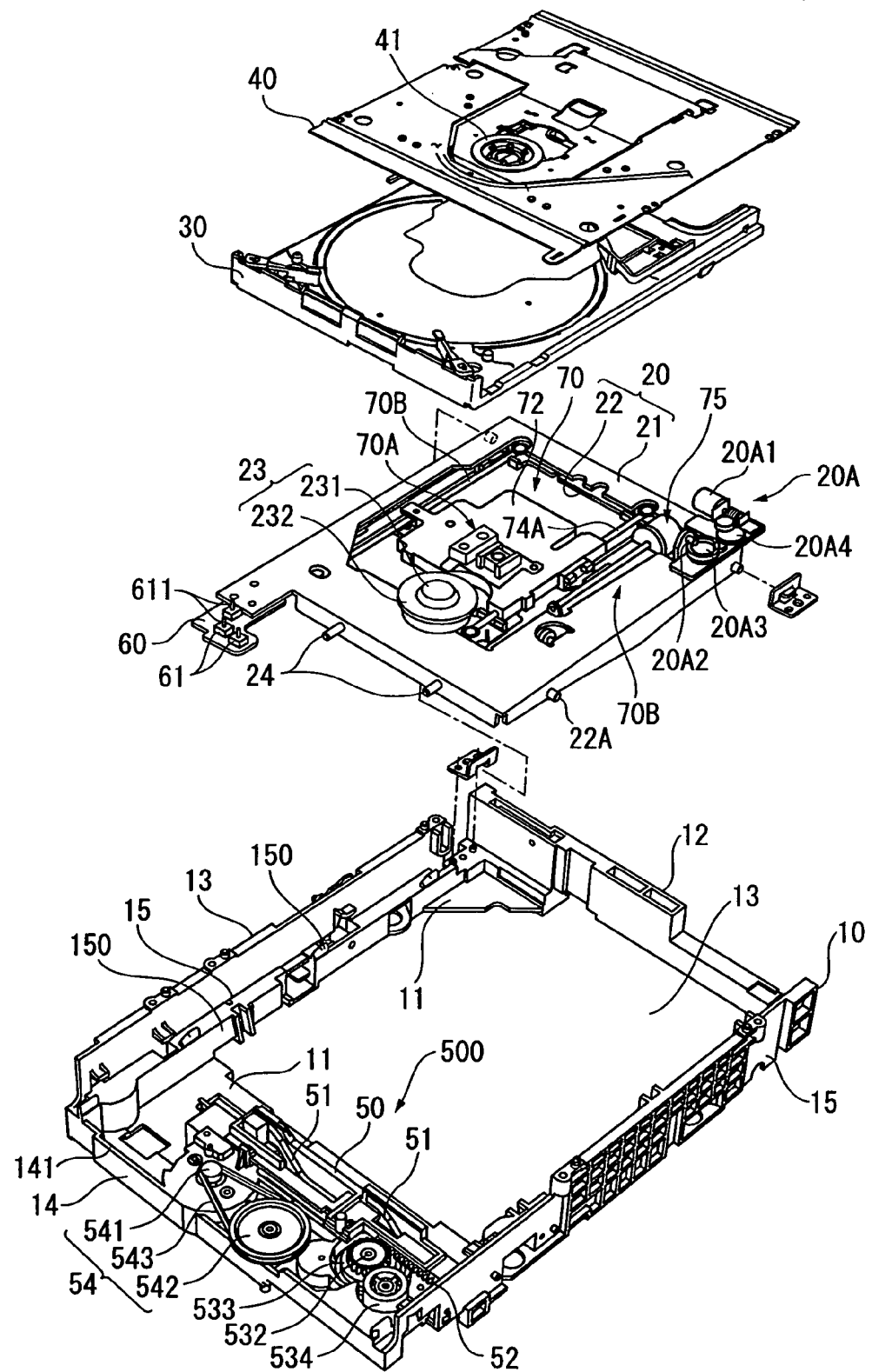
FIG. 2 is an exploded perspective view of the recording medium drive.

In FIGS. 1 and 2, the reference numeral 100 denotes a recording medium drive. The recording medium drive 100 houses a recording medium inside to record information on the recording medium or to reproduce the recorded information. The recording medium housed in the recording medium drive 100 includes a bare disc type recording medium in which discs such as CD (Compact Disc) and DVD (Digital Versatile Disc) are used as they are, and a cartridge type recording medium in which the optical discs are housed in cartridges. The recording medium drive 100 may be housed in terminal equipment such as a personal computer or audio equipment or may be attached outside the terminal equipment or the audio equipment as an external drive. Application of the recording medium drive is not limited to peripheral equipment such as the terminal equipment and the audio equipment as described above, but includes a stand-alone device such as portable CD player, and various devices for driving a recording medium using an optical disc or a magnetic disc.

The recording medium drive 100 includes a frame 10 having substantially rectangular shape in plan view, a base 20 attached inside the frame 10, a tray 30 adapted to eject from/retract into the frame 10, a clamp mechanism 40 covering an upper side of the frame 10 and a metal casing (not shown) covering outer peripheral surface of the frame.

[Arrangement of Frame]

The frame 10 is a member made of a synthetic resin or the like. The frame 10 is formed in a substantially box-like shape with a bottom portion 11 being a flat plate having a substantially rectangular shape. The frame 10 includes: a rear portion 12 formed integrally with the bottom portion 11 on one short edge thereof, a front portion 14 formed integrally with and uprightly from the bottom portion 11 on the other short edge thereof; lateral portions 15 formed integrally with the bottom portion 11 on both long edges thereof, the lateral portions 15 and the rear portion 12 enclosing and defining an upper opening 13 facing the bottom portion 11.

It is to be noted that, in the recording medium drive 100 regardless of whether it is installed horizontally or vertically, a side of the upper opening 13 is defined as upper side, a side of the bottom portion 11 facing thereto is defined as lower side, a side of the rear portion 12 is defined as rear side, and a side of the front portion 14 is defined as front side. A direction along the front side to the rear side is defined as moving direction; a direction from the lower side toward the upper side, i.e. a direction substantially in vertical to a recording surface of the recording medium housed in the recording medium drive is defined as a focus direction; and a direction orthogonal to the moving direction and a vertical direction is defined as lateral direction.

The bottom portion 11 is provided with the lateral portions 15, front portion 14 and the rear portion 12 on the edge, and a cavity is formed thereinside. The cavity is a space for an electric circuit (not shown) to be housed, the electric circuit controlling operation of the recording medium drive 100.

The rear portion 12 is provided with an external terminal (not shown) on the lower side, the external terminal electrically connected to the electric circuit formed on the bottom portion in the frame. The external terminal has, for instance, a power source cable connector for supplying an electrical power to the recording medium drive and an external terminal connector enabling external equipment such as personal computer to be connected thereto. Information reproduced and/or recorded by the recording medium drive 100 is mainly input to/output from the external terminal.

Sliding pieces 150 for slidably supporting the tray 30 are formed along the moving direction on inner walls of the lateral portions 15. The base 20 is swingably attached to the rear side of the lateral portions 15.

The front portion 14 is so formed that the size in the focus direction of the drawings is smaller as compared to the rear portion 12 and the lateral portions 15, and a front opening 141 for the tray 30 to be ejected therefrom and retracted thereinto is formed on the upper side of the front portion 14. Further, an operating portion (not shown) is provided on the front portion, the operating portion connected to the electric circuit formed on the bottom portion 11. The operating portion includes, for instance, an eject button for ejecting and retracting the tray 30, a volume control for controlling volume and an insertion hole of an earphone.

[Arrangement of Base]

Figure 3:
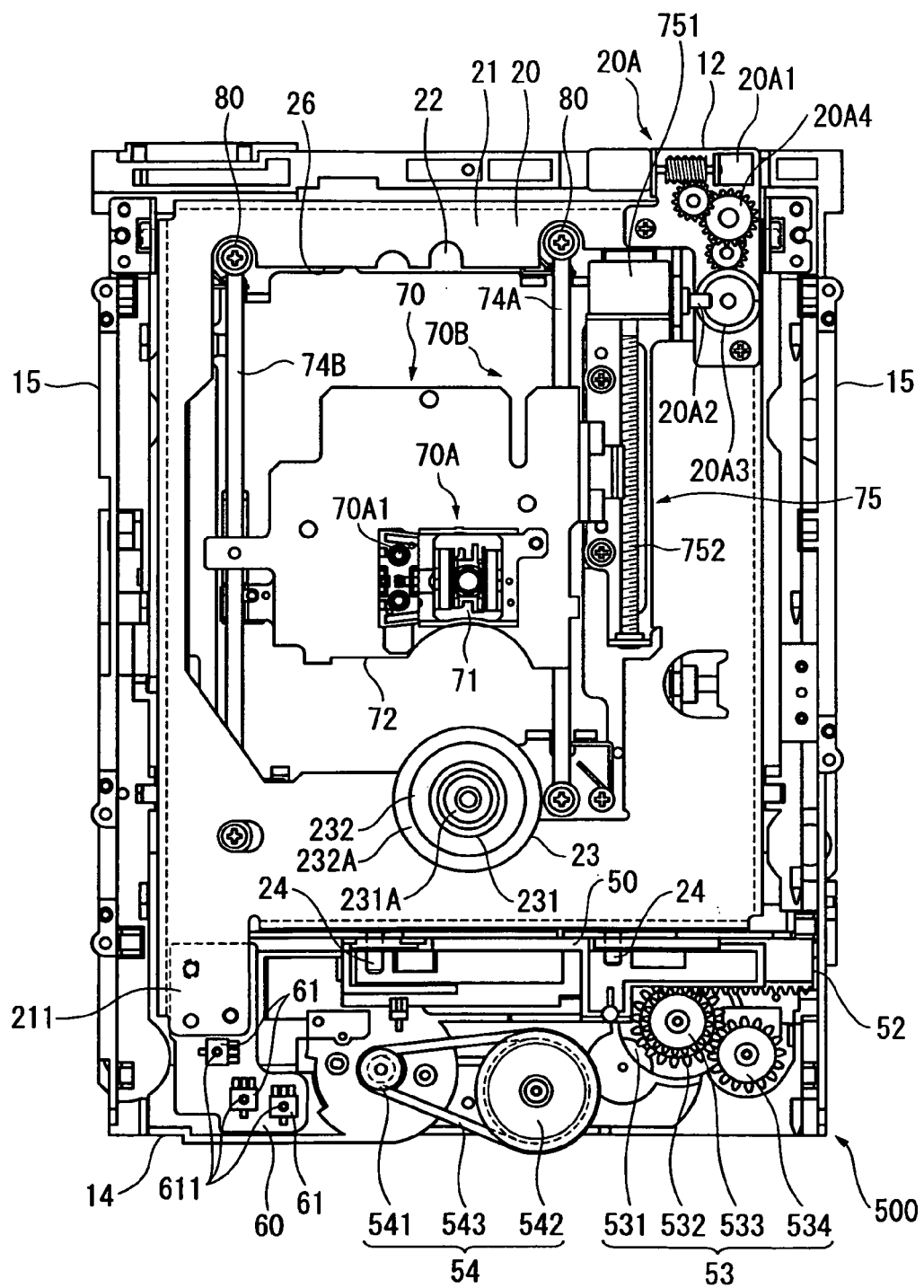
FIG. 3 is a plan view showing a part of the recording medium drive.
Figure 4:
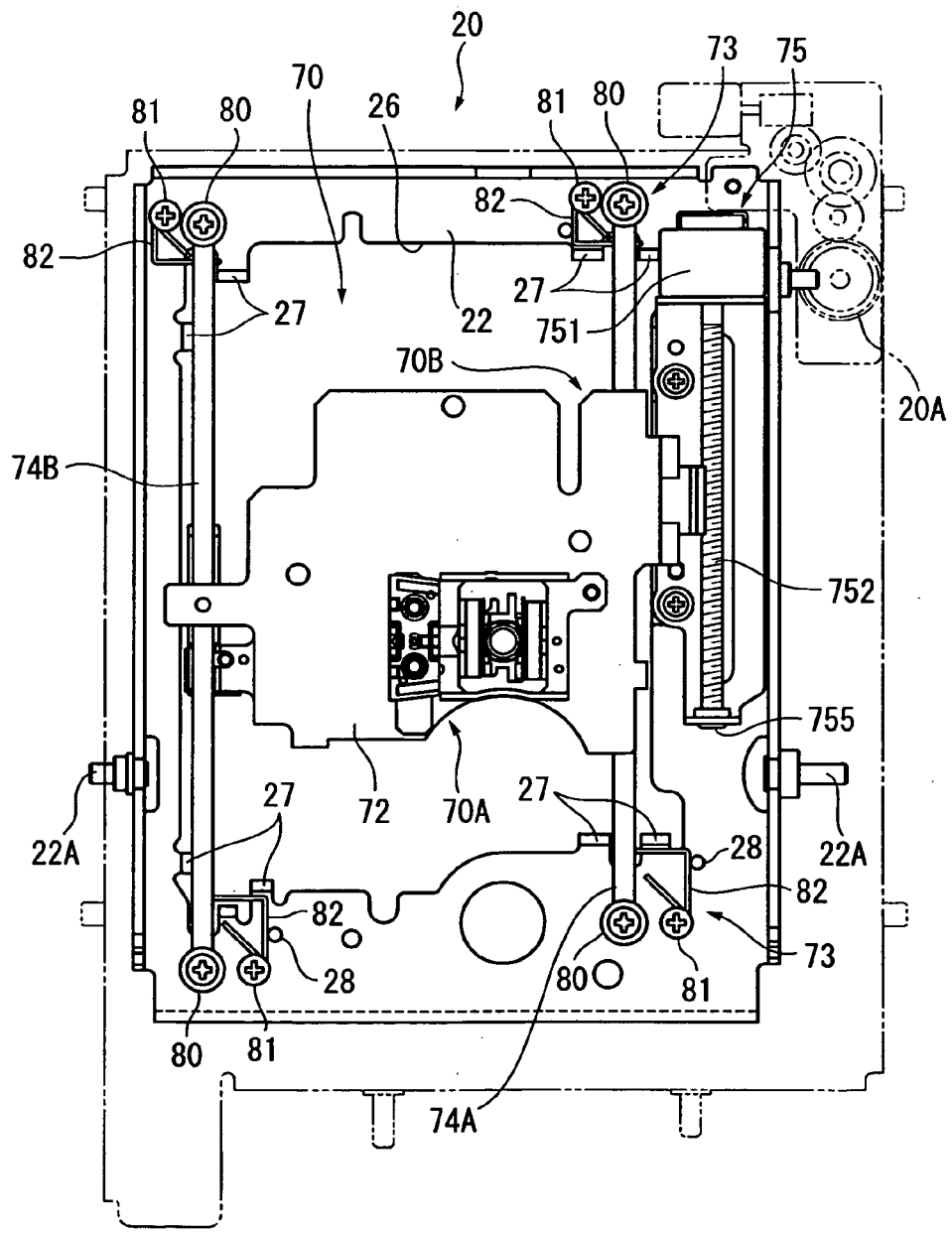
FIG. 4 is a plan view showing the arrangement of a tilt base.

FIG. 3 is a plan view with the clamp mechanism 40 and the tray 30 of the recording medium drive 100 removed therefrom, and FIG. 4 is a plan view showing the arrangement of a tilt base. In FIGS. 2 to 4, the base 20 includes a mechanical base 21 with a disc table 23 provided thereon and a tilt base 22 attached to the mechanical base 21 so as to be tiltable around a pin 22A, the mechanical base 21 provided with a tilt angle adjuster 20A for adjusting a tilt angle of the tilt base 22.

Each of the mechanical base 21 and the tilt base 22 is formed by, for instance, press molding of a metal plate. A recording/reproducing mechanism installation hole 26 is provided on the rear side relative to the disc table 23 of the tilt base 22, and a recording/reproducing mechanism 70 having a pickup device 70A is provided in the recording/reproducing mechanism installation hole 26.

The disc table 23 is attached at a position away from the front side of the mechanical base 21 by a predetermined distance and substantially at the center in the lateral direction so as to be rotatable around the focus direction as a rotation axis. The disc table 23 projects from the mechanical base 21 toward the upper side. With such arrangement, when a recording medium such as disc is mounted on the disc table 23, the disc can be prevented from contacting the base 20. A rotary drive mechanism (not shown) such as motor is provided on the lower side of the disc table 23, the rotary drive mechanism electrically connected by a flexible board made of synthetic resin and having the electric circuit and a electric conducting portion. When an electric signal of drive command is transmitted from the electric circuit, the rotary drive mechanism rotates the disc table 23 at high speed.

The disc table 23 includes a mounting portion 232 for the disc to be mounted and a tapered portion 231 formed at the center of the mounting portion 232 with its upper side formed in smaller diameter. The disc such as optical disc has a circular hole substantially at the center thereof, the circular hole being engaged with the tapered portion 231. As shown in FIG. 3, a sheet 232A made of synthetic resin is adhered on the upper side of the mounting portion 232 as a surface protector of the disc and as a slip stopper, while a magnet 231A is attached to the upper side of the tapered portion 231. The disc can be prevented from slipping off due to the sheet 232A even when the disc table 23 is rotated at high speed, so that the recording surface of the disc is not damaged.

A detection board attaching portion 211 projecting toward the front side is formed on one corner of the front side of the mechanical base 21. A flat plate-shaped detection board 60 is fixed to the lower side of the detection board attaching portion 211. A screw can be employed in this fixing. A detection switch 61 is formed uprightly toward the upper side on the detection board 60, the detection switch 61 connected to the electric circuit via a wire (not shown) extending on the lower side of the base 20. A detection pin 611 is formed toward the upper side on a tip end of the detection switch 61. The detection pin is used, for instance, for reading information such as whether writing on a cartridge is allowed or not allowed when a cartridge type disc is mounted on the tray 30.

In FIGS. 3 and 4, the tilt angle adjuster 20A includes a sensor 70A1 provided on the pickup device 70A for detecting a distance from the disc, a guide pin 20A2 provided on an end of the tilt base 22, a cam 20A3 abutting on a peripheral surface of the guide pin 20A2 and rotatably provided on the mechanical base 21, a gear mechanism 20A4 meshing with the cam 20A3, and a motor 20A1 for rotating/reversing the gear mechanism 20A4 when receiving a signal from the sensor 70A1. When the disc mounted on the disc table 23 is bended and curved along a radial direction, the tilt angle adjuster 20A tilts the pickup device 70A so that the distance from the curved surface becomes consistent. For instance, when the disc is upwardly curved toward the outer circumferential edge, the tilt angle adjuster 20A is actuated to move the recording/reproducing mechanism 70 upwardly by moving an entire part of the tilt base 22. On the contrary, for instance, when the disc is downwardly curved toward the outer circumferential edge, the tilt angle adjuster 20A is actuated to move the recording/reproducing mechanism 70 downwardly by moving an entire part of the tilt base 22.

[Arrangement of Recorder/Reproducer]

FIGS. 5A to 6C each show moving states of the recording/reproducing mechanism 70. In each of the drawings, diameter of cross section of a lead screw 752 is indicated with small indication for helping understanding of explanation.

The recording/reproducing mechanism 70 includes the pickup device 70A for reading from and writing on the disc and a pickup drive mechanism 70B for supporting the pickup device 70A so as to move the pickup device 70A in a tracking direction, i.e., in the moving direction. The pickup device 70A has a lens 71. The pickup device 70A can record and/or reproduce information by, for instance, irradiating a laser beam onto the recording surface of the disc. In reproducing the information, the pickup device 70A irradiates the laser beam having passed through the lens 71 onto the recording surface and collects the reflection, so that the information can be reproduced by obtaining information according to the recording surface based on the reflection amount. In recording the information, for instance, the pickup device 70A irradiates a strong beam such as laser beam through the lens 71 onto the recording surface, so that information can be recorded on the recording surface in accordance with a signal of the information.

The pickup drive mechanism 70B includes a pickup supporter 72 as a support member for supporting the pickup device 70A, a main shaft 74A for slidably supporting the pickup supporter 72 as a support shaft, a sub shaft 74B attached in substantially parallel to the main shaft 74A for slidably supporting the pickup device 70A as a support shaft in the same manner as the main shaft 74A, and a driving portion 75 for sliding the pickup supporter 72 in the tracking direction.

The pickup supporter 72 is provided with a circuit (not shown), the circuit electrically connected with the pickup device 70A. The circuit is electrically connected to the electric circuit (not shown) formed on the bottom portion 11 of the frame 10 by a flexible board with a wiring circuit arranged thereon. When a command for reproducing information from and/or recording information on the disc is transmitted from the electric circuit, the pickup device 70A performs reproducing and/or recording via the circuit of the pickup supporter 72. Also, the information obtained from the disc and the information recorded on the disc by the pickup device 70A are also transmitted to the electric circuit via the circuit.

Figure 5A:
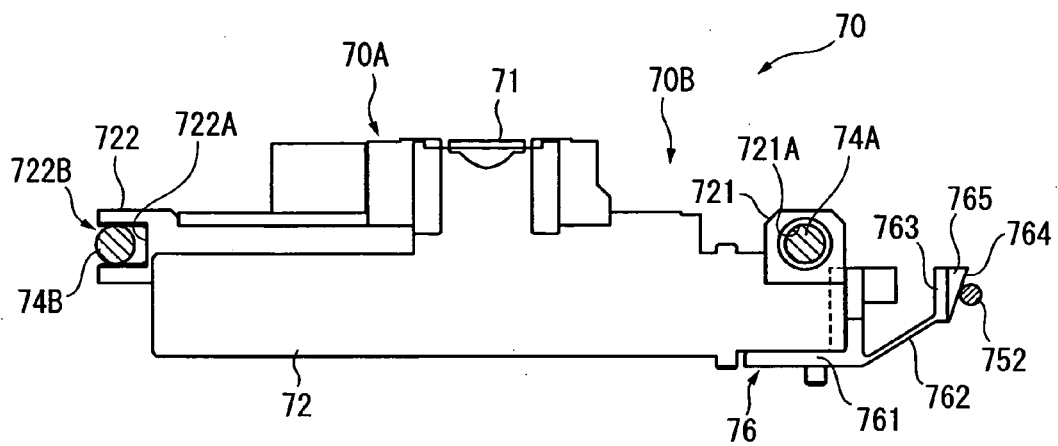
FIG. 5A is a cross section schematically showing a lateral direction of a recording/reproducing mechanism.
Figure 6A:
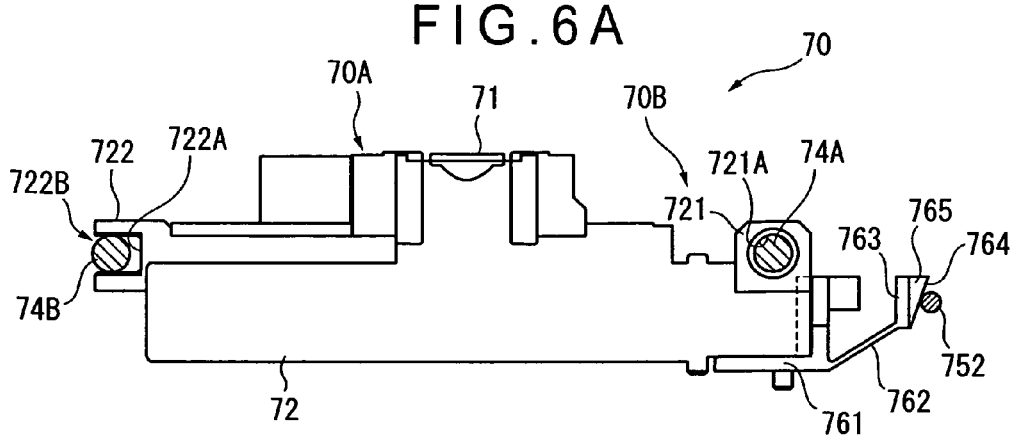
FIG. 6A is a cross section schematically showing a lateral direction of the recording/reproducing mechanism.

As shown in FIGS. 5A and 6A, the pickup supporter 72 includes a main shaft bearing 721, a sub shaft bearing 722 and a driver 76. The main shaft bearing 721 and the sub shaft bearing 722 are provided on both lateral sides of the pickup supporter 72. A main shaft insertion hole 721A penetrating in the tracking direction is formed on the main shaft bearing 721, to which the main shaft 74A is inserted. Diameter of the main shaft insertion hole 721A is formed to be substantially the same as that of the main shaft 74A. A lubricant such as grease is applied to an inner peripheral surface of the main shaft insertion hole 721A and an outer peripheral surface of the main shaft 74A, so that main shaft bearing 721 can smoothly slide on the main shaft 74A. With such arrangement, the main shaft bearing 721 brings the inner peripheral surface of the main shaft insertion hole 721A into contact with the outer peripheral surface of the main shaft 74A, so that the main shaft bearing 721 is attached to the main shaft 74A in a manner securely preventing jounce.

A sub shaft insertion groove 722A extending in the tracking direction is formed on the sub shaft bearing 722. Width of the sub shaft insertion groove 722A in the focus direction is substantially the same as that of the sub shaft 74B, which has an opening 722B in the lateral direction. The sub shaft 74B is inserted into the sub shaft insertion groove 722A of the sub shaft bearing 722. A lubricant such as grease is applied between the sub shaft insertion groove 722A and the sub shaft 74B, which allows smooth sliding of the sub shaft 74B and the sub shaft insertion groove 722A. The opening 722B serves as a clearance for further smoothing slide of the pickup supporter 72. Since the main shaft 74A is inserted into the main shaft insertion hole 721A and supported without jounce in the lateral direction, the clearance is formed so that the sub shaft 74B can escape in the lateral direction when slight distortion is generated due to impact or the like.

The driver 76 is formed on a corner defined by the lower side of the pickup supporter 72 and the lateral side provided with the main shaft bearing 721. The driver 76 includes a fixing portion 761 fixed to the pickup supporter 72, a connecting portion 762 extending from the fixing portion 761 toward a side of the lead screw 752 of a later-described driving portion 75, an abutment attaching portion 763 formed on an tip end of the connecting portion 762, an abutment 765 attached to the abutment attaching portion 763 and provided with a screw abutting surface 764 that abuts on the lead screw 752, and a biasing unit (not shown) for biasing the screw abutting surface 764 toward the lead screw 752.

Figure 5B:
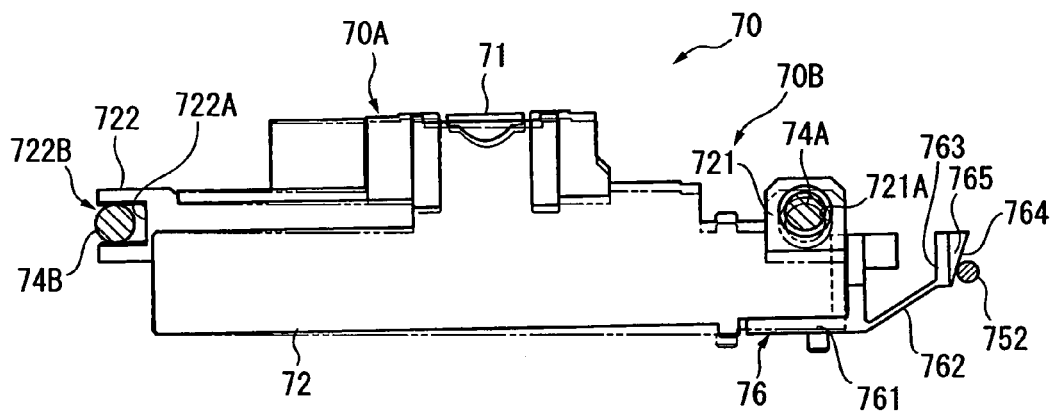
FIG. 5B is a cross section showing a state where a main shaft in FIG. 5A is moved toward an upper side in a focus direction.
Figure 5C:
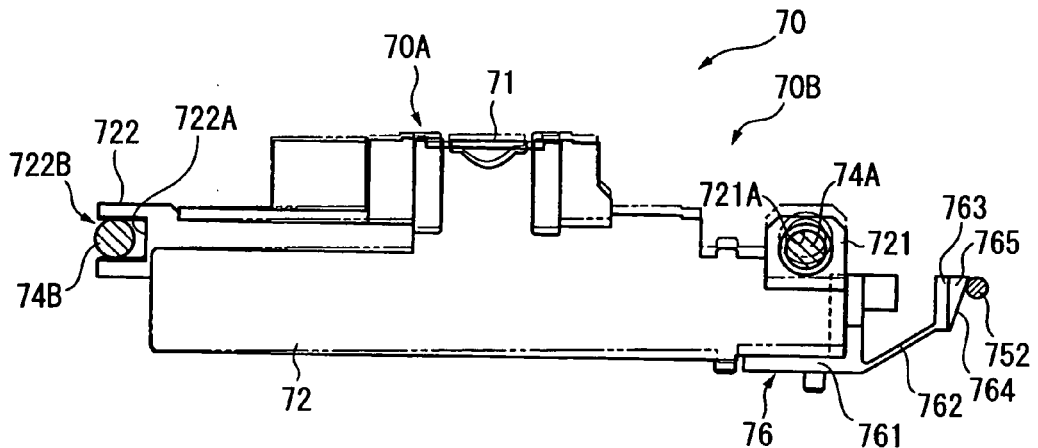
FIG. 5C is a cross section showing a state where the main shaft in FIG. 5A is moved toward a lower side in the focus direction.
Figure 6B:
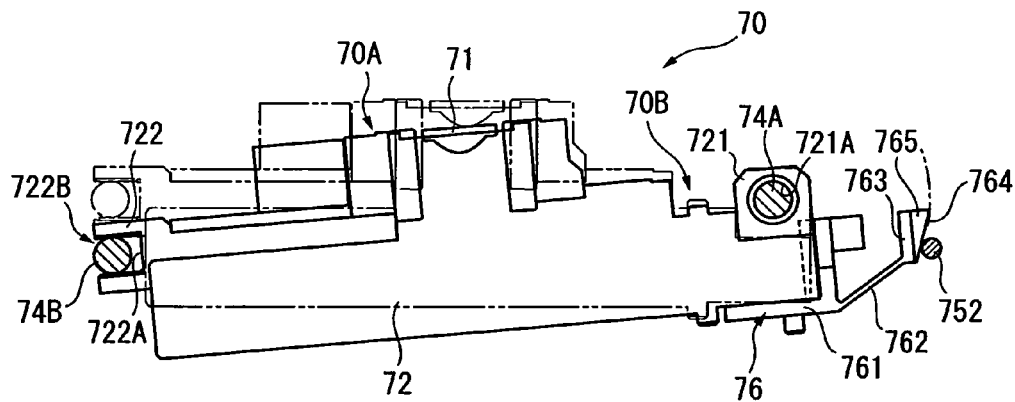
FIG. 6B is a cross section showing a state where a sub shaft in FIG. 6A is moved toward the lower side in the focus direction.
Figure 6C:
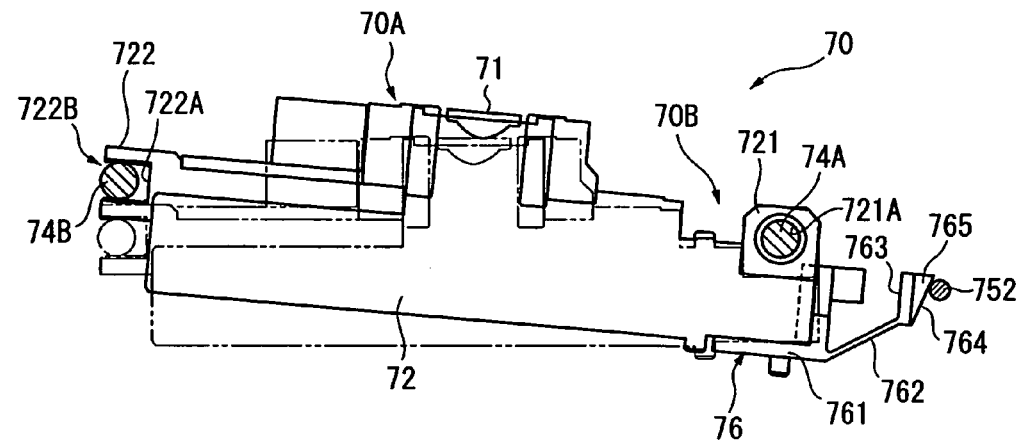
FIG. 6C is a cross section showing a state where the sub shaft in FIG. 6A is moved toward the upper side in the focus direction.

The abutment 765 has the screw abutting surface 764 that is parallel to an axial direction of the lead screw 752 and orthogonal to the focus direction and a plane direction substantially vertical to the focus direction. For instance, when a height of the main shaft 74A is adjusted by a skew screw 80 (described later), the screw abutting surface 764 is tangentially formed on a contact point of an arc and the lead screw 752 as shown in FIGS. 5A to 5C, the arc centering around the axis of the sub shaft 74B with a distance from the sub shaft 74B to the lead screw 752 as a radius thereof. For instance, when a height of the sub shaft 74B is adjusted by the skew screw 80, the screw abutting surface 764 is tangentially formed on a contact point of an arc and the lead screw 752 as shown in FIGS. 6A to 6C, the arc centering around the axis of the main shaft 74A with the distance from the main shaft 74A to the lead screw 752 as a radius thereof.

The screw abutting surface 764 may be tangentially formed on a contact point of the lead screw 752 and a curved surface defined substantially in the middle of the arc centering around the main shaft 74A and the arc centering around the sub shaft 74B. In this case, although the arc centering around the main shaft 74A and the arc centering around the sub shaft 74B have difference in their radii, since the screw abutting surface 764 is biased toward the lead screw 752 by the biasing unit (not shown) in the present embodiment, a gap is not generated between the screw abutting surface 764 and the lead screw 752. Therefore, the screw abutting surface 764 can abut on the lead screw 752 even when either skew height of the main shaft 74A or the sub shaft 74B is adjusted. Incidentally, adjustment of skew height described herein is not limited to an adjustment performed by adjusting height of one of or both of the main shaft 74A and the sub shaft 74B to change a tilt of the recording/reproducing mechanism 70 in the lateral direction, but includes an adjustment performed by adjusting a height of one end of the main shaft 74A or the sub shaft 74B relative to the other end to change a tilt of the recording/reproducing mechanism 70 in the moving direction.

A rack (not shown) meshing with a screw groove of the lead screw 752 is formed on the screw abutting surface 764, and rotation of the lead screw 752 is transmitted to the pickup supporter 72 via the driver 76 as a driving force in the tracking direction. In the present embodiment, since the lead screw 752 is positioned at lower side relative to the main shaft 74A and the sub shaft 74B, the screw abutting surface 764 being an inclined surface with the upper side thereof projecting in the lateral direction, but the arrangement may changed depending on the position of the lead screw 752.

As the biasing unit for biasing the screw abutting surface 764 toward the lead screw 752, for instance, a coil spring or other types of elastic members that are disposed between the fixing portion 761 of the driver 76 and the abutment attaching portion 763 can be employed. In addition, an arrangement can also be employed, where the connecting portion 762 functions as a plate spring and biases the abutment attaching portion 763 and the screw abutting surface 764 toward the lead screw 752. By forming the connecting portion 762 with the plate spring, other elastic members such as coil spring can be eliminated, resulting in reduction of the number of components.

The main shaft 74A and the sub shaft 74B are metallic cylindrical members, which are attached to the tilt base 22 in a manner spanning the recording/reproducing mechanism installation hole 26 in the tracking direction. The main shaft 74A and the sub shaft 74B are fixed by screwing the skew screws 80 into the tilt base 22 while being positioned by guide walls 27 formed on the tilt base 22.

Two pairs of the guide walls 27 are formed on the tilt base 22, the pairs of the guide walls 27 each having the main shaft 74A and the sub shaft 74B interposed therebetween. The guide walls 27 are integrally molded with the tilt base 22 by a sheet metal processing such as a press molding, and a distance between each pair of guide walls is formed to be slightly larger than each of diameters of the main shaft 74A and the sub shaft 74B.

The skew screws 80 are screwed and fixed into female screw holes (not shown) formed in advance on the tilt base 22 of the base 20. Cylindrical end surfaces on tip ends of the main shaft 74A and the sub shaft 74B abut on female screw portions (not shown) of the skew screws 80, and thereby the main shaft 74A and the sub shaft 74B are positioned in the tracking direction. Screw heads of the skew screws 80 abut on outer peripheral surfaces on the tip ends of the main shaft 74A and the sub shaft 74B, and thereby the main shaft 74A and the sub shaft 74B are positioned in the focus direction (a direction toward and away from the tilt base 22). By adjusting screwing degree of the skew screws 80 into the tilt base 22, a distance from the tilt base 22 to the screw heads of the skew screws 80 can be adjusted, so that the heights of the main shaft 74A and the sub shaft 74B can be adjusted. With such arrangement, the distance between the pickup device 70A and the disc can be adjusted by adjusting the heights of the main shaft 74A and the sub shaft 74B.

As shown in FIG. 4, torsion bars 82 fixed to the tilt base 22 by fixing screws 81 are provided between the main shaft 74A/the sub shaft 74B and the tilt base 22, the torsion bars 82 biasing the main shaft 74A and the sub shaft 74B toward the screw heads of the skew screws 80. Due to the biasing force, the main shaft 74A and the sub shaft 74B are biased in both of the focus direction and the lateral direction simultaneously. Thus, the main shaft 74A and the sub shaft 74B abut on the screw heads of the skew screws 80 and either one of the pair of guide walls 27 for positioning, so that the jounce of the main shaft 74A and the sub shaft 74B can be prevented. Note that an arrangement using the torsion bars 82 for biasing the main shaft 74A and the sub shaft 74B is exemplified herein, but, for instance, an arrangement using a plate spring may also be employed.

The driving portion 75 is a mechanism for advancing and retracting the pickup supporter 72, the driving portion 75 including the lead screw 752, a screw driving portion 751 provided on an end of the lead screw 752 and a screw shaft bearing 755 provided on the other end for receiving rotation of the lead screw 752.

In the present embodiment, the driving portion 75 is provided on one lateral side of the pickup supporter 72, but the driving portion 75 may be provided on either side of right and left. In other words, a position of the driving portion 75 may be determined depending on other components of the recording medium drive.

The lead screw 752 is a metallic cylindrical member having a spiral screw on the outer peripheral surface thereof, which is formed on the base 20 in parallel to the main shaft 74A and the sub shaft 74B. The screw driving portion 751 houses a motor (not shown) inside, which is electrically connected to the electric circuit. When the motor is rotated by a control signal from the electric circuit, the lead screw rotates around the axis. At this time, the screw shaft bearing 755 receives the rotational motion to prevent displacement of the lead screw 752 caused by the rotation. The screw shaft bearing 755 prevents an axial displacement of the lead screw 752 for keeping parallelism between the lead screw 752 and the main shaft 74A and the sub shaft 74B.

When the lead screw 752 rotates around the axis, a driving force is transmitted to the screw abutting surface 764 in accordance with the rotation of the screw, and thereby, the pickup supporter 72 is moved in the tracking direction. Consequently, the pickup supporter 72 that fixes the driver 76 having the screw abutting surface 764 can also be moved in the tracking direction. When the lead screw 752 is not rotated, movement of the rack of the screw abutting surface 764 is limited by a part of the lead screw 752. Therefore, unwanted movement of the pickup supporter 72 can be prevented.

[State of Abutting Surface in Height Adjustments of Main Shaft and Sub Shaft]

In the pickup drive mechanism 70B with the arrangement as described above, a state of the screw abutting surface 764 of the pickup supporter 72 and the lead screw 752 in adjusting the heights of the main shaft 74A and the sub shaft 74B will be described.

First, a case in which the skew height of the main shaft 74A is adjusted by adjusting the skew screws 80 provided on both sides of the main shaft 74A will be described with reference to FIGS. 5A to 5C. As shown in FIG. 5B, when the main shaft 74A is moved toward the upper side in the focus direction by adjusting the skew screws 80, the pickup supporter 72 rotates counterclockwise around the sub shaft 74B. Accordingly, the driver 76 fixed to the pickup supporter 72 also rotates counterclockwise around the sub shaft 74B. At this time, since the screw abutting surface 764 is tangentially formed on the contact point of the arc centering around the sub shaft 74B with the distance from the sub shaft 74B to the lead screw 752 being the radius thereof and the lead screw 752, the screw abutting surface 764 rotates along the periphery of the lead screw 752. Therefore, the biasing force biasing the screw abutting surface 764 toward the lead screw 752 by the biasing unit is substantially equal to the biasing force of the state shown in FIG. 5A, which is before adjusting the skew screw 80.

As shown in FIG. 5C, when the main shaft 74A is moved toward the lower side by adjusting the skew screws 80, the pickup supporter 72 rotates clockwise around the sub shaft 74B. Accordingly, the driver 76 fixed to the pickup supporter 72 also rotates clockwise around the sub shaft 74B. At this time, in the same manner as the state where the pickup supporter 72 is rotated counterclockwise, since the screw abutting surface 764 is tangentially formed on the contact point of the arc centering around the sub shaft 74B with the distance from the sub shaft 74B to the lead screw 752 being the radius thereof and the lead screw 752, the screw abutting surface 764 rotates along the periphery of the lead screw 752. Therefore, the biasing force biasing the screw abutting surface 764 toward the lead screw 752 by the biasing unit is substantially equal to the biasing force of the state shown in FIG. 5A, which is before adjusting the skew screw 80.

As described above, when the skew screw 80 on the main shaft 74A is adjusted to rotate the pickup supporter 72, the screw abutting surface 764 is biased toward the lead screw 752 with substantially equal biasing force, so that a predetermined amount of driving force can be constantly transmitted from the lead screw 752 to the pickup supporter 72.

Next, a case in which the skew height of the sub shaft 74B is adjusted by adjusting the skew screws 80 provided on both sides of the sub shaft 74B will be described with reference to FIGS. 6A to 6C. As shown in FIG. 6B, when the sub shaft 74B is moved toward the lower side in the focus direction, the pickup supporter 72 rotates counterclockwise around the main shaft 74A. Accordingly, the driver 76 fixed to the pickup supporter 72 also rotates counterclockwise around the main shaft 74A. At this time, since the screw abutting surface 764 is tangentially formed on the contact point of the arc centering around the main shaft 74A with the distance from the main shaft 74A to the lead screw 752 being the radius thereof and the lead screw 752, the screw abutting surface 764 rotates along the periphery of the lead screw 752. Therefore, the biasing force biasing the screw abutting surface 764 toward the lead screw 752 by the biasing unit is substantially equal to the biasing force of the state shown in FIG. 6A, which is before adjusting the skew screw 80.

As shown in FIG. 6C, when the sub shaft 74B is moved toward the lower side in the focus direction by adjusting the skew screws 80, the pickup supporter 72 rotates clockwise around the main shaft 74A. Accordingly, the driver 76 fixed to the pickup supporter 72 also rotates clockwise around the main shaft 74A. At this time, in the same manner as the state where the pickup supporter 72 is rotated counterclockwise, since the screw abutting surface 764 is tangentially formed on the contact point of the arc centering around the main shaft 74A with the distance from the main shaft 74A to the lead screw 752 being the radius thereof and the lead screw 752, the screw abutting surface 764 rotates along the periphery of the lead screw 752. Therefore, the biasing force biasing the screw abutting surface 764 toward the lead screw 752 by the biasing unit is substantially equal to the biasing force of the state shown in FIG. 6A, which is before adjusting the skew screw 80.

As described above, when the skew screws 80 on the sub shaft 74B are adjusted to rotate the pickup supporter 72, the screw abutting surface 764 is biased toward the lead screw 752 with substantially equal biasing force, so that a predetermined amount of driving force can be constantly transmitted from the lead screw 752 to the pickup supporter 72.

[Arrangement of Tray]

The tray 30 is a member made of a synthetic resin such as ABS resin, on which the recording medium such as CD and DVD is mounted to be housed in the recording medium drive.

The tray 30 includes a mounting surface 31 formed in a rectangular shape in plan view, on which the recording medium is mounted, and an upright portion 32 upright from the front side of an edge of the mounding surface 31 as a dropping stopper of the recording medium. Linear grooves (not shown) are integrally formed on lateral sides of the lower side of the tray 30 along a direction in which the tray 30 ejects and retracts, the grooves being engaged by the sliding pieces 150 of the lateral portions. The tray 30 can eject and retract smoothly in the moving direction due to the grooves and the sliding pieces 150.

[Arrangement of Clamp Mechanism]

The clamp mechanism 40 is attached to the upper opening 13 of the frame 10, the clamp mechanism 40 holding the recording medium engaged with the disc table 23 so as not to drop off from the disc table 23. The clamp mechanism 40 has a clamper 41 at a position facing the disc table 23, the clamper 41 being supported by a clamper holder 42. The clamper 41 is made of a synthetic resin with a disc-shaped metal member (not shown) fit in the upper side of a central portion thereof. A plate spring 43 is provided on the clamper holder 42 for biasing toward upper side when the clamper holder 42 is moved toward the lower side.

[Connection Between Base 20 and Tray]

In FIGS. 2 and 3, an interlocking mechanism 500 is provided on the front side of the base member. The interlocking mechanism 500 includes a drive cam 50 engaging with the base 20, a first rack 52 integrally formed with the drive cam 50, a gear mechanism 53 meshing with the first rack 52 and having a first gear 531 through a fourth gear 534, a motor 54 meshing with a gear mechanism 53 and driven by control from the electric circuit, and a second rack (not shown) provided on the lower side of the tray 30 and meshing with the gear mechanism 53.

The drive cam 50 is made of synthetic resin or the like, which is disposed in a manner reciprocatable in the lateral direction orthogonal to the moving direction of the tray 30. A cam groove 51 extending in the lateral direction is formed on the rear side of the drive cam 50, the cam groove 51 being engaged by the cam engaging pin 24 of the base 20. The cam groove 51 is so formed that the middle part thereof is inclined in the lateral direction, where one end thereof is disposed on the upper side while the other end is disposed on the lower side. When the drive cam 50 reciprocates in the lateral direction, the cam engaging pin 24 is moved on the inclined part between both ends of the cam groove 51, which enables the base 20 to reciprocate in the vertical direction.

The first rack 52 formed on one lateral side of the drive cam 50 meshes with the third gear 533 of the gear mechanism 53. The second gear 532 having larger diameter than the third gear 533 is integrally formed on the lower side of the third gear 533, the second gear 532 meshing with the first gear 531 and the fourth gear 534.

The first gear 531 meshes with a motor gear 542 of the motor 54. The motor gear 542 is connected with a wheel 541 by a ring-shaped belt 542 made of a synthetic resin. A motor body (not shown) is provided on the lower side of the wheel 541 via the frame 10, so that the motor body directly supplies the driving force to the wheel 541. The motor body is electrically connected to the electrical circuit, so that rotation of the motor body is controlled by the electric circuit.

The fourth gear 534 meshes with a second rack (not shown) provided on the lower side of the tray 30.

When a command for ejecting/retracting the tray is transmitted to the electric circuit by an operation on the eject button (not shown) provided on the front portion 14 of the frame 10 or an input from the outside, the electric circuit drives the motor body. When the motor body starts rotation, the rotation is transmitted to the first gear 531 of the gear mechanism 53 via the wheel 541 and the motor gear 542. Then, the rotation power is transmitted from the first gear 531 to the second gear 532, which rotates the third gear 533 integrally formed with the second gear and the fourth gear 534 meshing with the second gear 532. The rotation of the third gear 533 causes the drive cam 50 meshing with the third gear 533 through the first rack 52 to move in the lateral direction, so that the base 20 engaging with the drive cam 50 moves to the upper side or the lower side. Further, the rotation of the fourth gear 534 causes the tray 30 meshing with the fourth gear 534 through the second rack to move to the rear side or the front side.

[Effects and Advantages of Recording Medium Drive]

In the recording medium drive 100 described above, the pickup supporter 72 supporting the pickup device 70A includes the driver 76 having the screw abutting surface 764 that is substantially in parallel to the axial direction of the lead screw 752 and intersecting with both the focus direction and the plane direction substantially vertical to the focus direction. With this arrangement, even when the pickup supporter 72 and the driver 76 are rotated around the main shaft 74A or the sub shaft 74B to change the posture of the pickup device, by adjusting the heights of the main shaft 74A or the sub shaft 74B, the screw abutting surface 764 can abut on the lead screw 752 at a substantially constant angle as the screw abutting surface 764 is formed in a direction substantially identical with a tangent direction of the arc of rotation. Therefore, when the pickup supporter 72 having the screw abutting surface 764 as described above is rotated, substantially constant driving force can be transmitted from the lead screw 752 regardless of the rotation angle, stable and proper driving force can be constantly obtained.

In a state where the screw abutting surface 764 is tangentially formed between the curved surface substantially in the middle of the arc centering around the main shaft 74 and the arc centering around the sub shaft 74B and the lead screw 752, the screw abutting surface 764 can be securely abutted on the lead screw 752 by the biasing unit in either case where the height of the main shaft 74A is adjusted or the height of the sub shaft 74B is adjusted. Therefore, whatever change is made to the posture of the pickup supporter 72, the screw abutting surface 764 and the lead screw 752 abut on each other, so that the pickup supporter 72 can obtain proper driving force.

Since the screw abutting surface 764 is formed to be flat, the abutment 765 can be easily prepared once determining the tilt angle of the screw abutting surface 764. For instance, when the tilt angle of the screw abutting surface 764 is determined, the abutment 765 can be prepared by forming a triangle pole having a substantially right-angled triangle cross section and defining the screw abutting surface 764 by a plane corresponding to an oblique line of the triangle cross section.

Since the biasing unit for biasing the screw abutting surface 764 toward the lead screw 752 is provided, the screw abutting surface 764 and the lead screw 752 can securely abut on each other. Accordingly, the screw abutting surface 764 securely abuts on the lead screw 752 even when the pickup supporter 72 is rotated, so that the driving force can be securely transmitted from the lead screw 752 to the screw abutting surface 764.

Further, the rack meshing with the screw groove of the lead screw 752 is formed on the screw abutting surface. With such arrangement, the rack can accurately transmit the rotation amount of the lead screw 752 to the pickup supporter via the driver 76. Therefore, rotation of the lead screw 752 can be securely and accurately converted to sliding in the tracking direction.

[Modification]

Incidentally, the scope of the present invention is not restricted to the above-described embodiments, but includes modifications and improvements as long as an object of the present invention can be achieved.

For instance, in the present embodiment exemplifies an arrangement where the recording medium is mounted on the tray 30, which is then housed inside the recording medium drive 100, but the arrangement is not limited thereto. For instance, the recording medium drive may be a so-called slot-in type, where the tray is not provided and the recording medium is directly inserted into the recording medium drive.

Figure 7A:
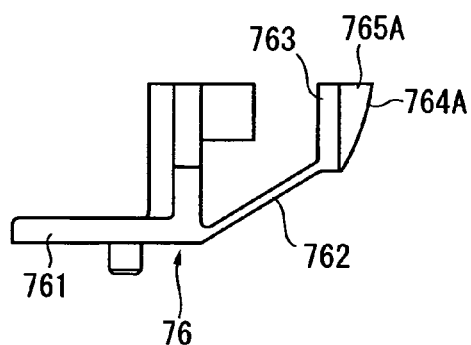
FIG. 7A is a cross section showing a screw abutting surface of a modification of the present invention.
Figure 7B:
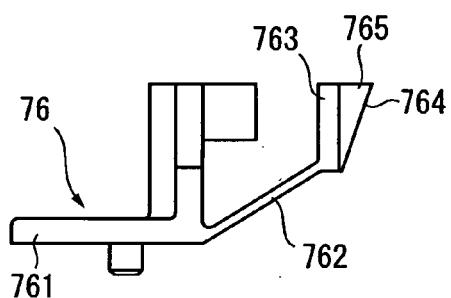
FIG. 7B is a cross section showing a screw abutting surface of another modification of the present invention.

In the present embodiment, the screw abutting surface 764 is formed to be surface, but the arrangement is not limited thereto. For instance, as shown in FIG. 7A, the screw abutting surface may be curved. It is to be noted that FIG. 7B shows the planar screw abutting surface 764 of the present embodiment as a comparison with FIG. 7A. In FIG. 7A, the screw abutting surface 764A may be curved substantially along both of the arc edge centering around the axis of the main shaft 74A with the distance from the main shaft 74A to the lead screw 752 as the radius thereof and the arc edge centering around the axis of the sub shaft 74B with a distance from the sub shaft 74B to the lead screw 752 as the radius thereof. In such case, since the screw abutting surface 764A is curved, when the pickup supporter 72 rotates, the angle of contact surface contacting the lead screw 752 can be maintained substantially constantly, as compared with the case having a flat surface. Therefore, the lead screw 752 and the screw abutting surface 764A can abut on each other more securely.

Figure 7C:
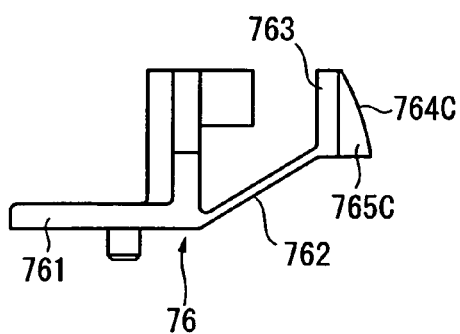
FIG. 7D is a cross section showing a screw abutting surface of further modification of the present invention.
FIG. 7E is a cross section showing a screw abutting surface of still further modification of the present invention.
FIG. 7F is a cross section showing a screw abutting surface of yet further modification of the present invention.
Figure 7D:
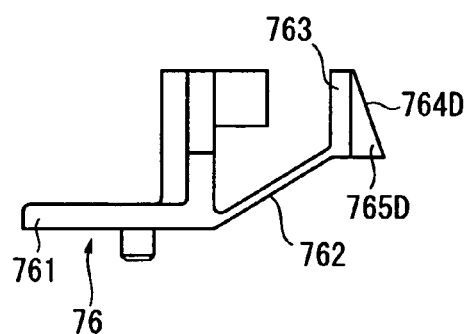
Figure 7E:
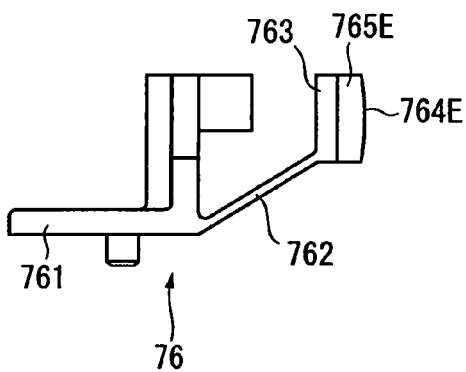
Figure 7F:
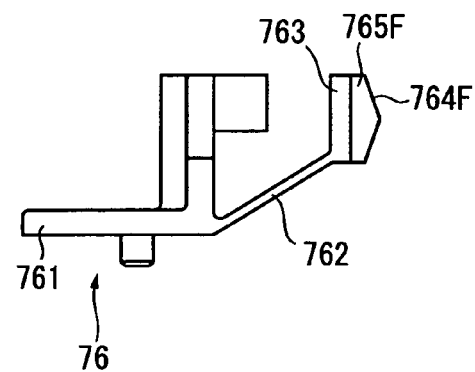

In the present embodiment, the screw abutting surface 764 is an inclined surface with its upper side projecting in the lateral direction relative to the lower side, but the arrangement is not limited thereto. As described above, the screw abutting surface 764 has the above-described arrangement as the lead screw 752 is located at the lower side compared with the main shaft 74A and the sub shaft 74B, and the shape of the screw abutting surface 764 varies as shown in FIGS. 7C to 7F depending on the position of the lead screw 752. FIGS. 7C and 7D show examples where the lead screw is disposed at the upper side relative to the main shaft and the sub shaft, while FIGS. 7E and 7F show examples where the lead screw, the main shaft and the sub shaft are disposed in parallel substantially on a single plane. Incidentally, FIGS. 7C and 7D show examples where screw abutting surfaces 764C, 764E are curved, while FIGS. 7D and 7F show examples where screw abutting surfaces 764D, 764F are flat.

In FIGS. 7C and 7D, if the main shaft is moved upwardly by adjusting the skew screw of the main shaft or if the sub shaft is move downwardly by adjusting the skew screw of the sub shaft, the pickup supporter rotates counterclockwise. Thus, when the lead screw is located at the upper side relative to the main shaft and the sub shaft, the lower sides of the screw abutting surfaces 764C, 764D move in a direction away from the lead screw. On the contrary, when the main shaft is moved downwardly by adjusting the skew screw of the main shaft or when the sub shaft is moved upwardly by adjusting the skew screw of the sub shaft to rotate the pickup supporter clockwise, upper sides of the screw abutting surfaces 764C, 764D rotate in a direction toward the lead screw. The screw abutting surfaces 764C, 764D are inclined surfaces with the lower sides projecting in the lateral direction relative to the upper sides so that the lead screw and the screw abutting surfaces 764C, 764D can abut on each other constantly by a predetermined biasing force.

In FIGS. 7E and 7F, if the main shaft is moved upwardly by adjusting the skew screw of the main shaft or if the sub shaft is move downwardly by adjusting the skew screw of the sub shaft, the pickup supporter rotates counterclockwise. Thus when the lead screw, the main shaft and the sub shaft are located substantially on a single plane, lower sides of the screw abutting surfaces 764E, 764F move in a direction toward the lead screw. On the contrary, when the main shaft is moved downwardly by adjusting the skew screw of the main shaft or when the sub shaft is moved upwardly by moving the skew screw of the sub shaft to rotate the pickup supporter clockwise, upper sides of the screw abutting surfaces 764E, 764F rotate in a direction toward the lead screw. The screw abutting surfaces 764E, 764F are inclined surfaces with the substantially central portion thereof projecting in the lateral direction so that the lead screw and the screw abutting surfaces 764E, 764F can abut on each other constantly by a predetermined biasing force.

As described above, the screw abutting surface varies in many ways depending on positional relationship between the main shaft/the sub shaft and the lead screw, so that it should be preferable to form the screw abutting surface in accordance with the positional relationship between the main shaft/the sub shaft and the lead screw.

In the present embodiment, two shafts of the main shaft 74A and the sub shaft 74B are used as support shafts, but the arrangement is not limited thereto. For instance, the number of support shafts may be larger; e.g., three support shafts may be disposed in parallel on both sides and substantially at the center of the pickup supporter. Increasing the number of the support shafts as described above can provide an arrangement that is resistant to impact or the like.

Although the best arrangement and method for implementing the present invention has been disclosed above, the present invention is not limited thereto. In other words, while the present invention has been described with reference to specific embodiments and drawing thereof, various modifications in shapes, materials, quantity and other arrangement details may be made to the disclosed embodiments by those of ordinary skill in the art without departing from the technical idea and object of the invention.

Since the description limiting to the shapes and the materials described above is intended to be illustrative for easier understanding and not to be limiting the invention, the present invention includes descriptions of materials without all or a part of the limitation of the shapes, the material and the like.

Effects and Advantages of Embodiment

In the recording medium drive 100 of the present embodiment, the pickup supporter 72 supporting the pickup device 70A includes the driver 76 having the abutting surface 764 that is a flat surface substantially in parallel to the axial direction of the lead screw 752 and intersecting with both the focus direction and the plane direction substantially vertical to the focus direction. With such arrangement, even when the pickup supporter 72 and the driver 76 are rotated around the main shaft 74A and the sub shaft 74B by adjusting the heights of the main shaft 74A and the sub shaft 74B, the screw abutting surface 764 can abut on the lead screw 752 at a substantially constant angle. Therefore, when the pickup supporter 72 having the screw abutting surface 764 as described above is rotated, substantially constant driving force can be transmitted from the lead screw 752 regardless of the rotation angle, stable and proper driving force can be constantly obtained.

The priority application Number JP 2004-080915 upon which this patent application is based is hereby incorporated by reference.

What is claimed is:

1. A pickup drive mechanism comprising:
    a supporter for supporting a pickup device;
    a plurality of height-adjustable support shafts provided in parallel to each other and slidably supporting the supporter; and
    a lead screw for sliding the supporter along the height-adjustable support shafts, wherein
    the pickup device rotates around one of the plurality of height-adjustable support shafts when a posture of the supporter is changed by adjusting heights of the height-adjustable support shafts,
    the supporter has a screw abutting surface that is formed substantially in parallel to an axial direction of the lead screw while abutting on the lead screw,
    the screw abutting surface is angled to intersect respectively with a focus direction substantially orthogonal to a recording surface of a disc where a data is reproduced and/or recorded by the pickup device, and a plane direction orthogonal to the focus direction and substantially parallel to the height-adjustable support shafts, and
    the screw abutting surface being tangent to an arc, the arc including a contact point of the screw abutting surface and the lead screw, the arc being centered on a rotational axis coinciding with one of the plurality of height-adjustable support shafts, and a radius of the arc equaling a distance from the rotational axis to the lead screw;
    whereby the screw abutting surface abuts on the lead screw at a substantially constant angle as the pickup device rotates, such that a substantially constant driving force is transmitted from the lead screw to the supporter.

2. The pickup drive mechanism according to claim 1, wherein the screw abutting surface is flat.

3. The pickup drive mechanism according to claim 1, wherein the screw abutting surface is curved.

4. The pickup drive mechanism according to claim 1, further comprising a biasing unit for biasing the screw abutting surface toward the lead screw.

5. The pickup drive mechanism according to claim 1, wherein a rack portion meshing with the lead screw is formed on the screw abutting surface.

6. A recording medium drive comprising a pickup drive mechanism, the pickup drive mechanism comprising:
    a supporter for supporting a pickup device;
    a plurality of height-adjustable support shafts provided in parallel to each other and slidably supporting the supporter;
    a lead screw for sliding the supporter along the height-adjustable support shafts, wherein
    the pickup device rotates around one of the plurality of height-adjustable support shafts when a posture of the supporter is changed by adjusting heights of the height-adjustable support shafts,
    the supporter has a screw abutting surface that is formed substantially in parallel to an axial direction of the lead screw while abutting on the lead screw, and
    the screw abutting surface is angled to intersect respectively with a focus direction substantially orthogonal to a recording surface of a disc where a data is reproduced and/or recorded by the pickup device, and a plane direction orthogonal to the focus direction and substantially parallel to the height-adjustable support shafts, and the screw abutting surface being tangent to an arc, the arc including a contact point of the screw abutting surface and the lead screw, the arc being centered on a rotational axis coinciding with one of the plurality of height-adjustable support shafts, and a radius of the arc equaling a distance from the rotational axis to the lead screw;

whereby the screw abutting surface abuts on the lead screw at a substantially constant angle as the pickup device rotates, such that a substantially constant driving force is transmitted from the lead screw to the supporter.

7. The recording medium drive according to claim 6, wherein the screw abutting surface is flat.

8. The recording medium drive according to claim 6, wherein the screw abutting surface is curved.

9. The recording medium drive according to claim 6, further comprising a biasing unit for biasing the screw abutting surface toward the lead screw.

10. The recording medium drive according to claim 6, wherein a rack portion meshing with the lead screw is formed on the screw abutting surface.

* * * * *